United States Patent [19]
Barbier et al.

[11] Patent Number: 5,687,862
[45] Date of Patent: Nov. 18, 1997

[54] HOLLOW GLASS OBJECTS

[75] Inventors: Rene M. Barbier, St Blimont, France; Michel M. Resse, Eu, France

[73] Assignee: Saint-Gobain Emballage, Courbevoie, France

[21] Appl. No.: 380,978

[22] Filed: Jan. 31, 1995

Related U.S. Application Data

[62] Division of Ser. No. 67,072, May 26, 1993, Pat. No. 5,407,457.

[30] Foreign Application Priority Data

May 26, 1992 [FR] France ............... 92 06396

[51] Int. Cl.$^6$ ....................................... B65D 1/02
[52] U.S. Cl. ................. 215/40; 215/228; 401/122
[58] Field of Search ................... 215/40, 41, 228; 220/672, 675; 401/122

[56] References Cited

U.S. PATENT DOCUMENTS

| 491,198 | 2/1893 | Straus | 215/40 |
|---|---|---|---|
| 1,419,747 | 6/1922 | Miller | 215/40 |
| 1,698,528 | 1/1929 | Batchelor | 215/40 X |
| 4,632,240 | 12/1986 | Goncalves | 215/228 X |

FOREIGN PATENT DOCUMENTS

| 517284 | 12/1954 | Belgium | 215/40 |
|---|---|---|---|
| 181866 | 3/1907 | Germany | 215/40 |
| 685409 | 12/1939 | Germany | 215/40 |
| 844795 | 7/1952 | Germany | 215/40 |
| 204685 | 8/1939 | Switzerland | 215/40 |

Primary Examiner—Allan N. Shoap
Assistant Examiner—Christopher J. McDonald
Attorney, Agent, or Firm—Oblon, Spivak, McClelland, Maier & Neustadt, P.C.

[57] ABSTRACT

A forming process which utilize blown-blown technique has an initial phase, a transfer phase, and a finishing phase for producing a hollow glass object provided with a neck. During the initial phase all or part of the internal profile of the neck is molded by a mechanical element.

12 Claims, 6 Drawing Sheets

FIG_4c

FIG_4b

FIG_4a

FIG_5

FIG.6

HOLLOW GLASS OBJECTS

This is a Division of application Ser. No. 08/067,072 filed on May 26, 1993, now U.S. Pat. No. 5,407,457.

BACKGROUND OF THE INVENTION

1. Field of the Invention

The present invention relates to hollow glass objects. In particular, it deals with the production of objects such as bottles exhibiting a neck which may be threaded, where the production uses the so-called "blown-blown" technique.

2. Description of the Related Art

This technique, well known to those skilled in the art, can be schematically subdivided into three phases: the initial phase, the transfer phase, and the finishing phase.

The initial phase is the phase of forming the blank starting with a glass gob under compression in a parison mold and using a mechanical operation to initially puncture the neck, and then having an actual piercing operation performed by blowing into the blank.

The transfer phase consists of swinging the blank into the finishing mold while holding it by the neck.

The finishing phase is the one where the blank acquires its final shape in the finishing mold due to a second blowing operation.

Thus, in this technique the internal profile of the bottles is molded by pneumatic forces which are exerted against the internal walls of the bottle being formed, and this happens both during the initial phase and during the finishing phase, this in contrast to the so-called "pressed-blown" technique, in which during the initial phase the blank is pressed mechanically by a counter mold called a punch.

This means that in the "blown-blown" technique, which enjoys many advantages, especially in terms of production speed, it is relatively difficult to control the internal profile of the bottle to a high degree of precision, especially to ensure that the walls have a uniform and sufficient thickness. Thus far it has been impossible to use the blown-blown technique to reliably form a bottle whose internal profile must be locally modified for a specific functional need. Thus, for example, in the case of bottles designed for holding liquid substances of medical and/or cosmetic nature it would be very advantageous to be able to locally change the internal profile of the neck, in particular by producing a constriction zone which would control the quantity of product dispensed during application of said substances, especially when using a brush, and a zone which could, for example, also work together with the bottle closure.

SUMMARY OF THE INVENTION

Consequently, it is an object of the invention to develop hollow glass bottles based on the "blown-blown" technique, but permitting one to make modifications of the internal profile of the bottle necks, these modifications being precise, local and easily adjustable.

To make the hollow glass products equipped with a neck, the process according to invention utilizes the general technique referred to as "blown-blown". This technique comprises an initial molding phase, a transfer phase and a finishing phase. However, during the initial molding phase, all or part of the internal profile of the neck of said product is formed by mechanical means.

In this manner one can very advantageously separate the molding of a part of the internal profile of the neck from that involving the remainder of the product or bottle. A mechanical molding process is best suited to obtain a neck which exhibits a modified internal profile along at least a portion of height. This is because mechanical molding is very precise both with respect to the modification which one desires to achieve, and its location in the neck. In this way one can functionalize the neck, in particular by producing constrictions allowing for better control of flow of the liquid which will ultimately be contained in the bottle. However, one does not disturb the blow molding operations envisaged by the blown-blown technique to create the internal profile of the bottle beyond the neck. By adapting this technique without fundamentally altering the blown-blown principle, one retains all of its advantages without having to radically modify an industrial production line.

The initial puncturing of the neck in preferably always performed during the initial molding phase by mechanical means up to a depth which is greater than that of the internal profile of the neck which has been modified by mechanical molding. With the mechanical molding being carried out by at least one mechanical part which penetrates inside the neck to a certain height, it is desirable that the initial puncturing, meaning the creation of a cavity in the neck of the blank which will facilitate piercing by blowing, be performed "beyond" the mechanical molding zone.

Moreover, it is preferable after this mechanical molding and after this initial puncturing, that piercing be carried out by blowing during initial molding, as is characteristic of the blown-blown technique, in such a way as to preserve the profile of the neck as modified by mechanical molding. In effect, it should be ensured that the internal profile molded in this manner not be directly exposed to gaseous jets so that there is no risk that it becomes altered in a poorly controlled manner due to creep.

In pursuing the goal of keeping the molded profile unchanged, one can also adapt the blowing operation during the finishing phase. However, this final blowing operation is less critical from the point of view of the bottle neck than the preceding one to the extent that the glass at the neck is at a considerably lower temperature in the finishing mold than in the parison mold, and thus has a lower tendency to creep.

The internal molding of the neck and initial puncturing of the former are preferably performed with the aid of a die, whose tip portion can adopt any desired shape to impart to the neck the appropriate internal profile, and with the aid of a punch respectively.

In particular, the punch is mounted inside the die, the two parts being coaxial and capable of sliding along their common axis in an independent manner.

It is advantageous that said die be simultaneously capable of mechanically molding the inside of the neck and its lip. In this way it also participates in the molding of the external profile of the neck by acting together with an external mold.

A preferred embodiment of the process according to invention subdivides the initial molding phase into at least three stages. A first stage consists of mechanically molding the internal profile of the neck which one wants to modify with the aid of a die and performing the initial puncturing at the same time with the aid of a punch, the punch and the die both being in the "high" position along their essentially vertical axis, which is to say that the tip portion of the die is in a position for molding the inside of the neck, as is the punch, at a greater depth inside the blank.

The following stage is that of piercing by blowing through the punch, while the die is kept in the "high" position as the punch is brought to the"intermediate" position. While it is conventional in a blown-blown technique to proceed with the punch being partially withdrawn during blow piercing, according to the invention a mechanical part is kept in the neck, and a part is added in the molding position. In this manner one ensures that the internal molded profile of the neck does not have any direct contact with the gas jets during blowing.

The stage which finishes off the initial molding process consists of positioning the molding device assembly so as to transfer the blank to the finishing mold. In particular, both the die and the punch are brought to the "low" position in order to allow evacuation of the blank.

Thus the punch assumes at least three positions over the course of initial forming, while the die assumes at least two positions.

The invention also relates to the device which carries out this process with the same goal in mind, i.e., providing for the intervention of a special die and punch during initial molding and for the application of adapted blowing means during finishing.

The device and the process according to the invention are particularly well suited for making hollow glass products provided with a neck which is modified along its internal profile and, in particular, exhibiting a localized constriction. This constriction can, for example, have a cylindrical shape and be such that its diameter corresponds to approximately one half the inside diameter of the lip.

To the extent that the product is a bottle with a neck exhibiting external threading, it is advantageous to position this local modification of the internal profile of the neck, e.g., a constriction, at the level of this threading, and especially at the level of its seam, which terminates said threading. In this way, the constriction is localized at the level of the neck which has a large wall thickness, and this considerably lessen any risk of potential embrittlement of the neck which could accompany the modification of the internal profile.

The creation of an internal constriction is fully effective for the purpose of controlling the flow of fluids which are to be contained in these bottles, in particular fluids for medical and/or cosmetic applications, where one utilizes a brush type applicator rigidly attached to the closure of said bottles.

Of course, this a non-limiting application and one can conceive within the scope of invention a modification of the internal profile performed by means of molding which is designed, for example, to work together with the closure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

First of all, it should be pointed out that FIGS. 1a–1c through 4a–4c stress clarity of the drawings. Consequently, they are very schematic and only show the cross-section of those parts of the device to which the invention applies and/or parts which aid in understanding it.

Here, the aim is to produce a small sized bottle designed for holding a liquid cosmetic substance, which is to say a bottle whose total height is about 50 mm and having an approximately square base section with 25 mm sides. It has a neck with external threading whose height is about 13 mm. The object is to utilize the process and the device according to invention to produce an internal constriction of the neck at the level of the seam, while the inside diameter of the lip of the neck is about 7 mm.

Thus FIGS. 1a–1c and 2a–2c allow comparison of the initial molding step of a conventional blown-blown technique and the technique adapted according to invention.

The drawings focus on molding of the neck. Consequently, they show neither the blank, nor the parison mold, which are located above the neck.

Figure 1A:
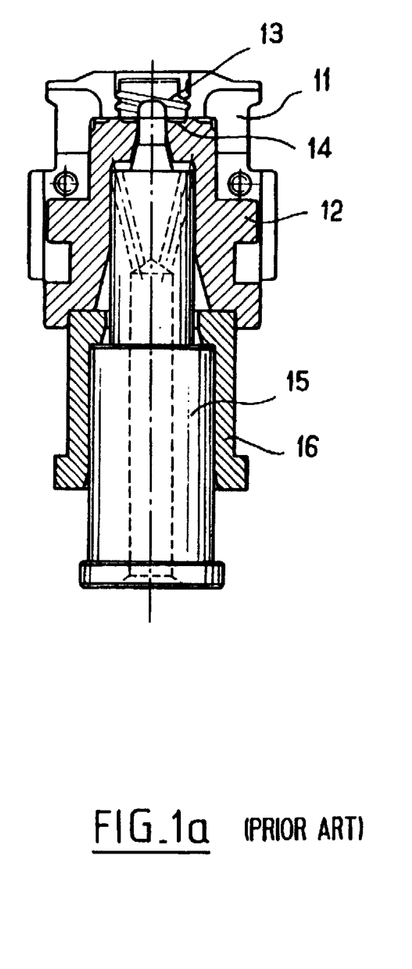
FIGS. 1a–1c show the stages of the standard "blown-blown" process during molding.
Figure 1B:
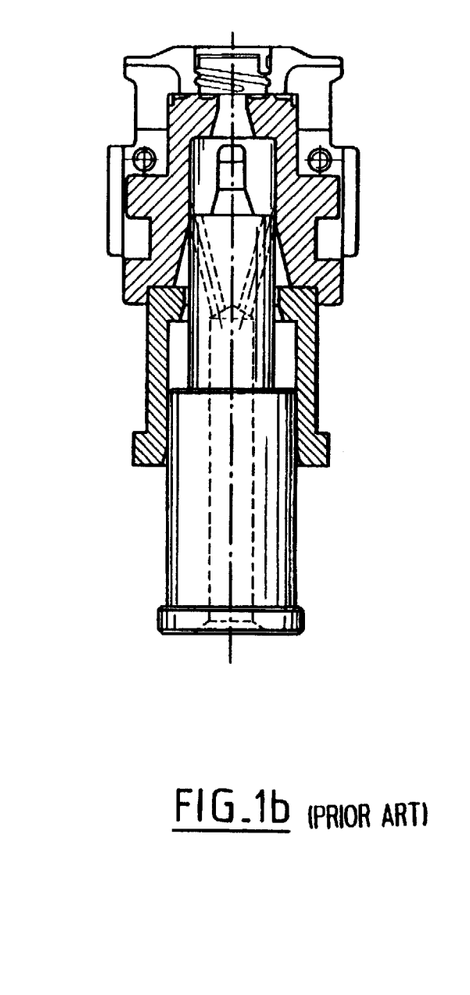
Figure 1C:
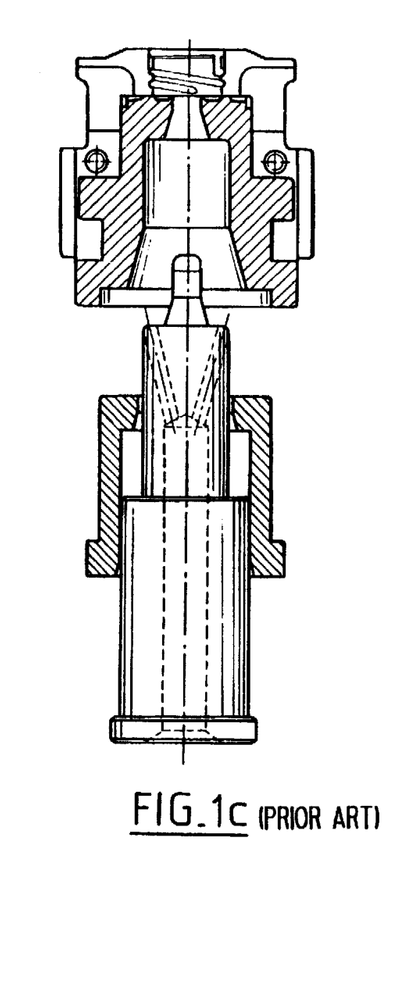

FIGS. 1a–1c subdivide the conventional "blown-blown" initial molding into three stages. It shows the mold for the external neck 11 cut into two half-molds centered by a ring 12. Those two parts work together to mold the external profile of the neck 13 and its lip 14. There is also a punch 15 which acts to initially puncture the neck, the punch being slide-mounted in a centering piece 16 which also slides along an approximately vertical axis. The movements of the two parts are controlled with the aid of mechanical means such as springs and/or pneumatic means, not shown, well-known to one skilled in the art.

In stage 1a the gob is received in the parison mold (not shown but located above the mold 11), with the neck mold 11 and the ring 12 forming the external profile of the neck 13 through compression, while the punch 15 mounted coaxially in its centering piece 16 is placed in the high position in order to perform the initial puncture.

In stage 1b blow piercing is performed while placing the punch 15 in the intermediate position, its centering part 16 being kept in the high position. The gas jets going through the punch 15 penetrate into the blank through the initial puncture previously produced by the punch 15.

Stage 1c shows the positioning of the device for molding the neck in preparation for transfer to the finishing mold; the punch 15 and its centering piece 16 are simultaneously lowered, a transfer arm (not shown) then takes the blank by neck 13, which is held in the neck mold 11 and the ring 12, to the finishing mold.

Figure 2A:
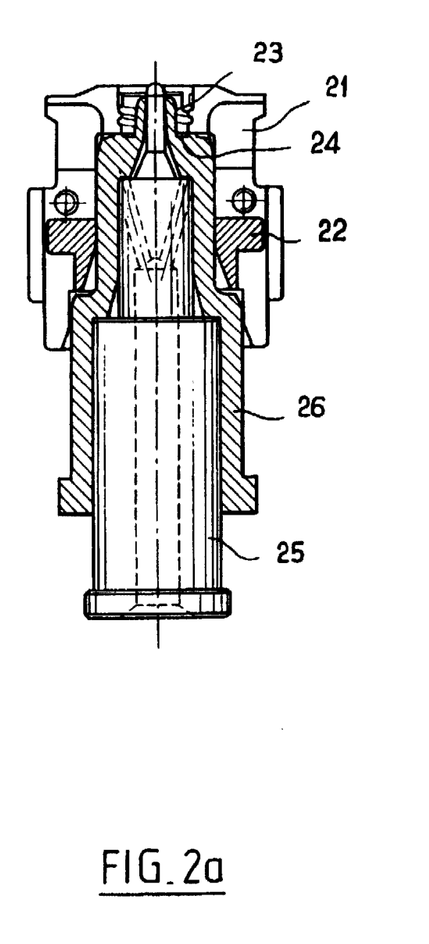
FIGS. 2a–2c show the stages of the process according to invention during initial molding.
Figure 2B:
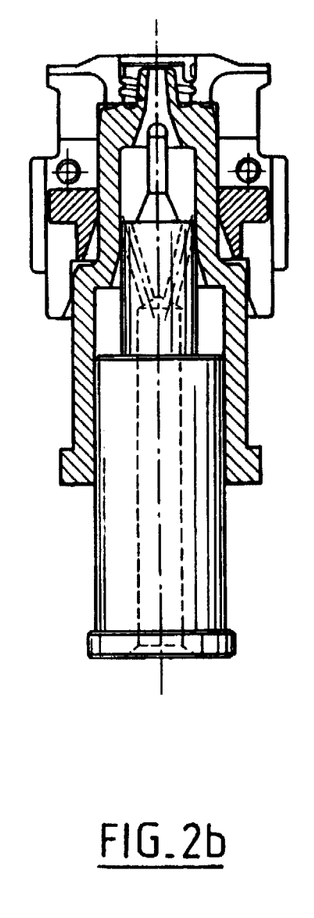
Figure 2C:
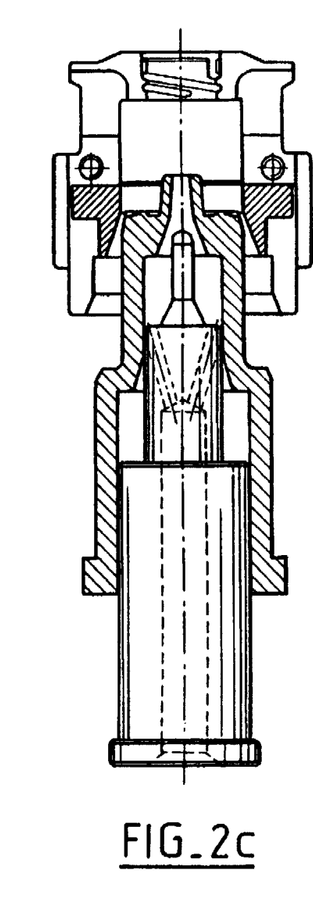

FIGS. 2a–2c illustrate the same succession of stages, but follow the process according to invention.

Stage 2a corresponds, as before, to compression molding of the external profile of the neck 23 by the neck mold 21. In contrast, to the conventional technique its lip 24 is not molded with the aid of ring 22, which in this case provides centering of both the neck mold 21 and a part 26, hereafter referred to as the die. This die 26 penetrates inside the blank and there molds the internal profile of the neck 23 at a height which does not exceed the total height of the finished bottle neck. Here, this height corresponds approximately to the height of the seam terminating the external threading of the neck. The punch 25, whose section is even smaller than usual, simultaneously performs the initial puncture inside the neck to a depth that is greater than that produced for molding with die 26, meaning a depth which is significantly greater than before. A constriction is therefore formed where the die 26 terminates. The die 26 and the punch 25 are slide-mounted, just like punch 15 and its centering piece 16 in the previous instance. Both are in the "high" position.

Stage 2b corresponds to the stage of blow piercing. This time the die 26 is kept in the "high" molding position, while the punch 25, through which the gas jets are sent, is placed in the intermediate position. Thus there is no direct contact of the gas with the internal walls of the neck molded by the die 26.

Stage 2c corresponds to the positioning of the neck molding device in preparation for transfer to the finishing mold. The die 26 and the punch 25 are lowered to the low position in order to allow for evacuation of the blank, as before.

The differences and advantages offered by the invention are demonstrated based on these two figures. The process and device according to invention completely change the function of the ring 12, 22, which no longer plays any molding role, and whose structure is greatly simplified. On the other hand, the centering piece 16 of the punch is replaced by a die 26 penetrating into the neck in order to mechanically modify the profile, in this case by creating a constriction at the level of the seam. In this fashion one can perfectly control the internal profile of the neck. It is thus useful to "protect" this internal profile during blowing to avoid creep and, in particular, creep at the level of the maximum constriction of said internal profile. The punch 25, whose section is reduced more than that of the conventional punch 15, is designed in such a manner that it can enter into the neck of the blank to a significantly greater height, which represents an adaptation necessary due to the presence of the die 26 in the same neck.

Meanwhile, it should be noted that the same sequence of three stages as in the "blown-blown" technique is retained. In this way, putting the invention to work in a "blown-blown" production line does not involve any major rearrangements of the same. The molding of external walls of the bottle as well as of its internal walls, except at the level of its neck, are not affected in any way. This is very advantageous from an industrial perspective. In contrast, one achieves an especially uniform molding of all or part of the internal profile of the neck.

FIGS. 3a–3c and 4a–4c permit comparison of the finishing phase according to a conventional "blown-blown" process and the process according to invention respectively. They illustrate a cross-section and, in a very schematic manner, the molding devices for the whole blank.

Figure 3A:
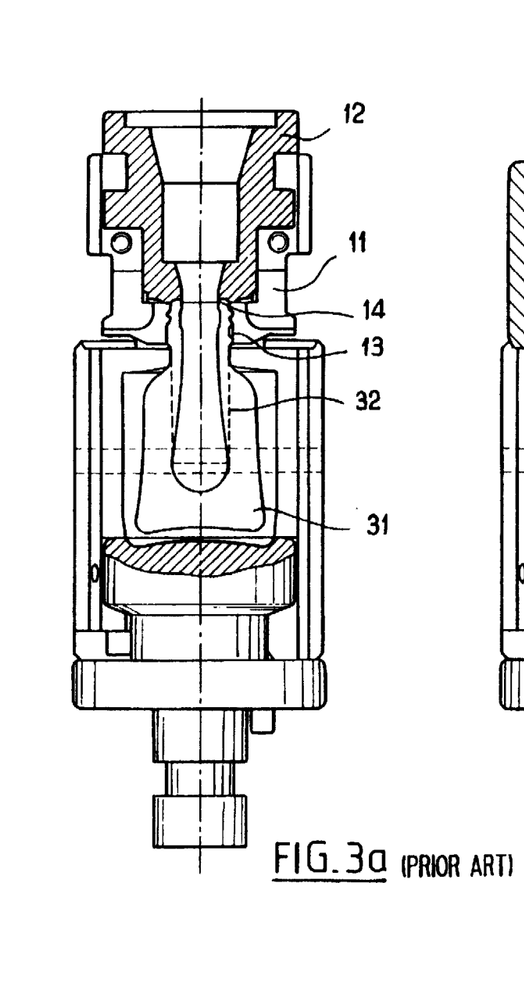
FIGS. 3a–3c show the stages of the standard "blown-blown" process during finishing.
Figure 3B:
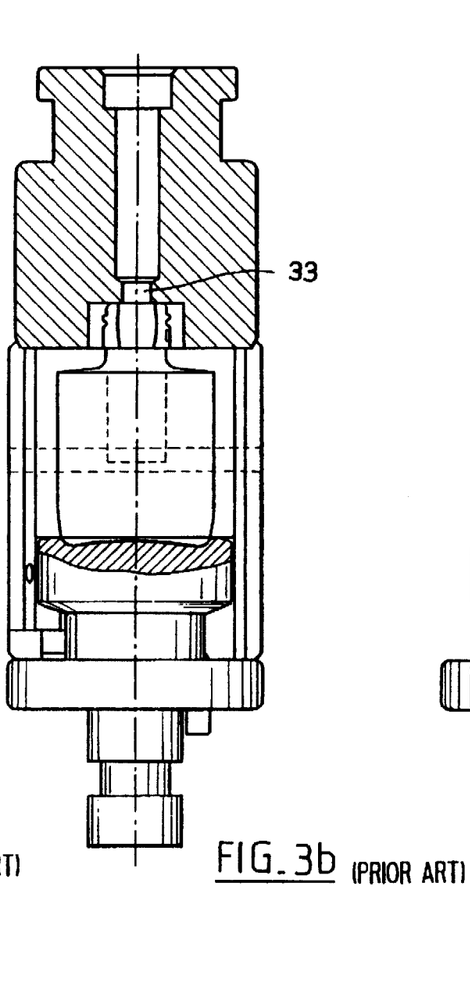
Figure 3C:
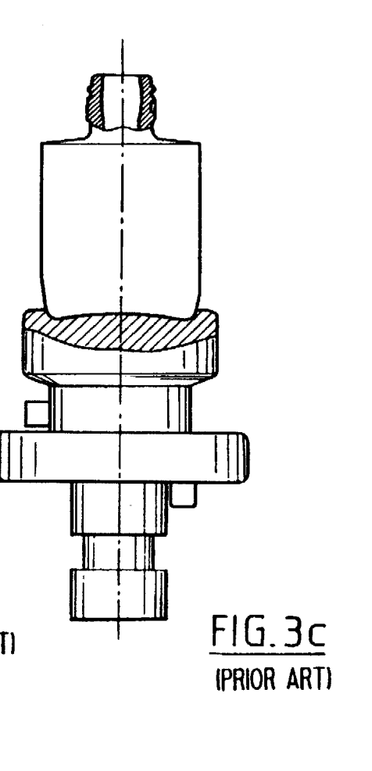

FIGS. 3a and 3b illustrate finishing according to the conventional process in two different stages. In FIG. 3a one finds the neck mold 11 and the ring 12 gripping the neck 13 of the blank. The finishing mold 31 is shown as is the blank 32. The latter is exposed to the blowing sections of gas jets coming through the neck 13, as indicated in FIG. 3b. The blowing head 33 is brought exactly to the level of the lip 14 of the neck 13, and the blowing operation is continued until the external walls of the blank 32 assumes the shape of the finishing mold 31. Thus, the finished bottle has internal walls which are formed exclusively by two blowing operations, one during initial molding and the other during finishing; this is also true at the level of the neck, which is why the internal profile of the neck is slightly widened (FIG. 3c).

Figure 4A:
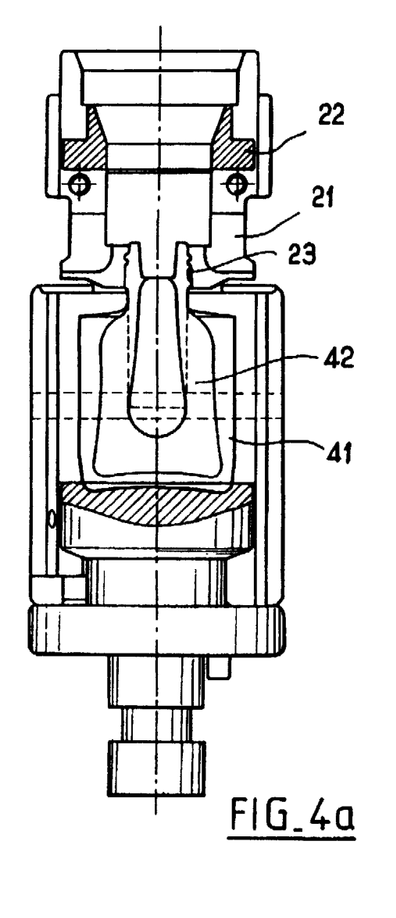
FIGS. 4a–4c shows the stages of the process according to invention during finishing.
Figure 4B:
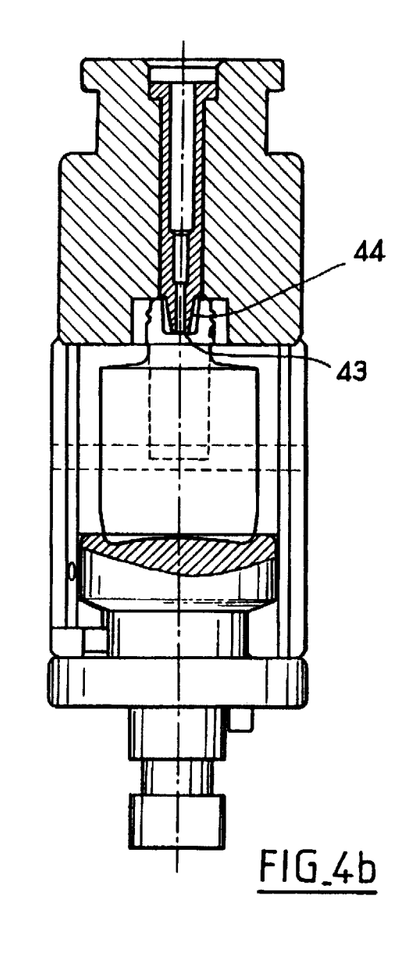

In FIG. 4a the ring 22 and the neck mold 21 grip the neck 23, as before. The important difference resides in the manner in which blowing is performed. It is desirable to adapt a blowing head 43 which terminates in a protective tube 44 with a widened profile relatively similar to the internal profile of the neck molded by the die during initial molding (FIG. 4b). The blowing head 43 equipped with its protective tube 44 enters the neck 23 to a depth that is roughly equal to that of the profile molded by the die. In this way one considerably reduces any risk that blowing through the blowing head 43 will act to deteriorate the profile molded by the die 26, particularly at the level of its maximum internal constriction. Meanwhile, it should be pointed out that it would be conceivable, within the scope of invention, to use a conventional blowing head 33, as in FIG. 3, at the price of a reduction and/or modification of the blowing force.

Figure 4C:
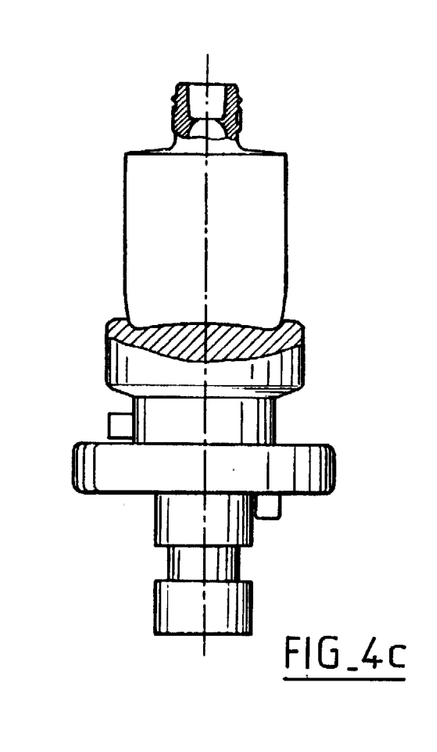
Figure 5:
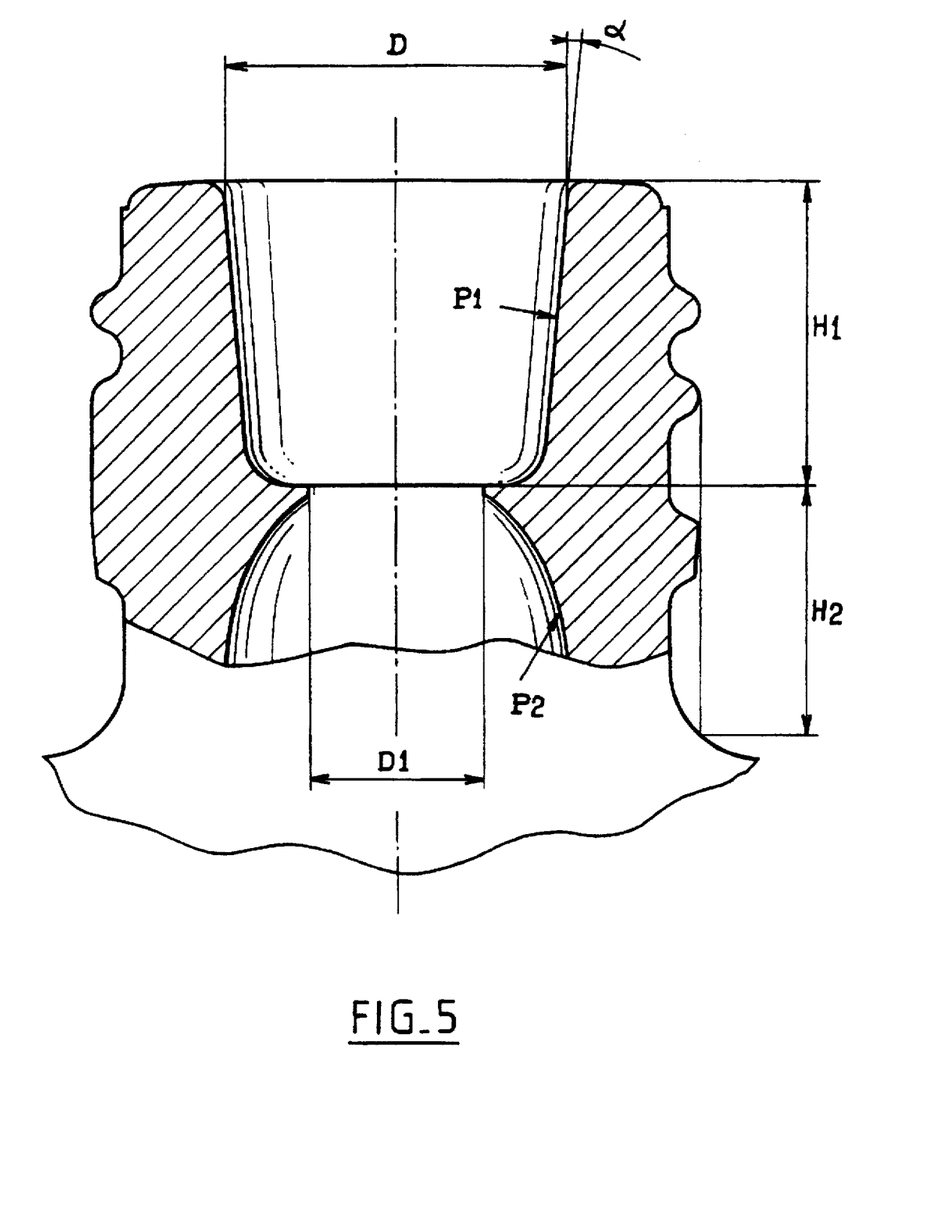
FIG. 5 is a cross-section of the neck of the bottle obtained with the aid of the invention.
Figure 6:
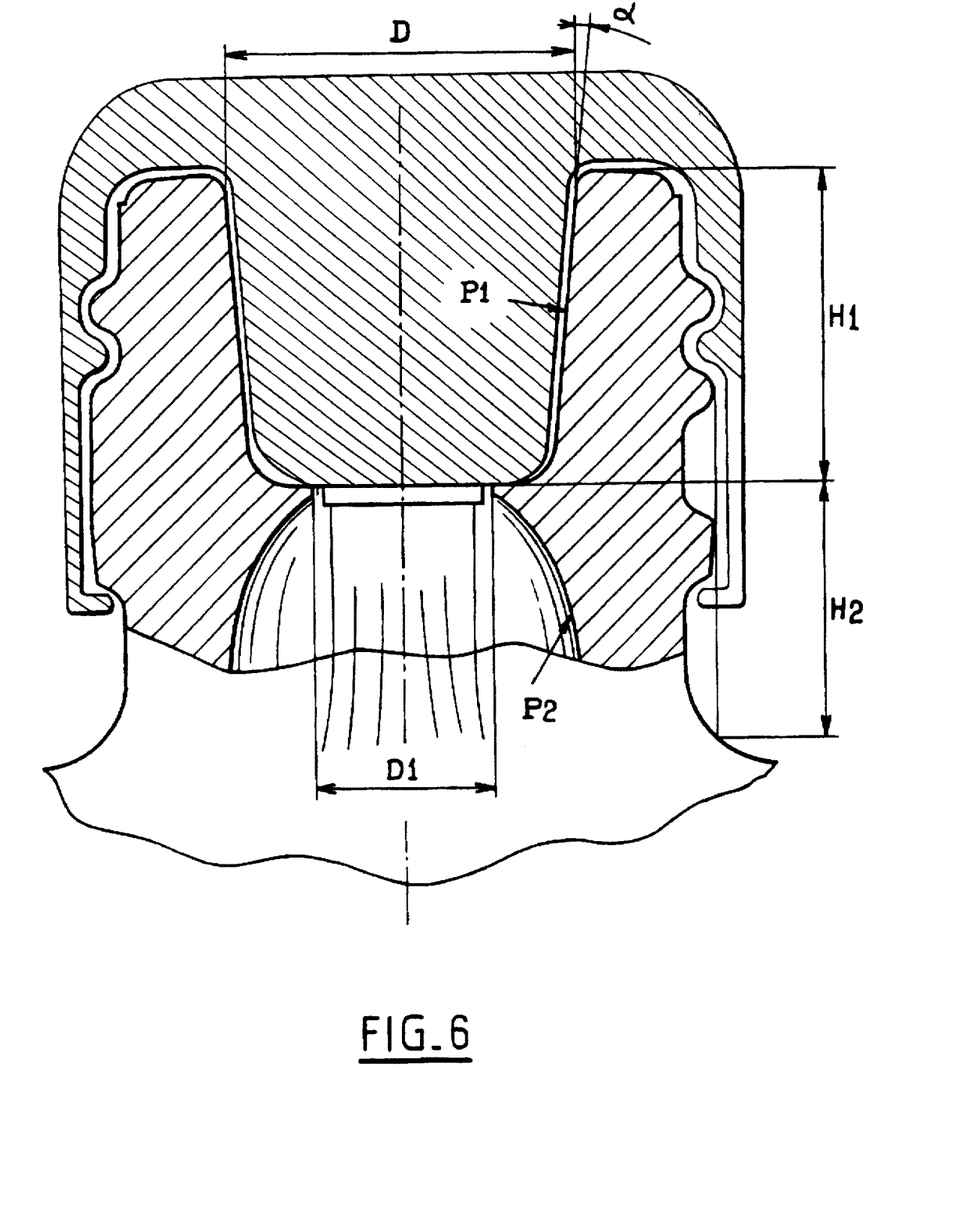
FIG. 6 corresponds to FIG. 5 but shows a cap and brush mounted to the bottle.

The finished bottle formed according to invention is shown in FIG. 4c. An enlargement is cross-section of its neck is shown in FIG. 5. The internal profile $P_1$ of the neck, with a total height $H_1$ (i.e. in the direction of the axis of the neck) has been modified along height $H_1$ by intervention of the die 26. At the level of the seam of the external threading there is a cylindrical constriction whose diameter $D_1$ in this case is approximately one half of the inside diameter D of the lip 24 of the neck 23. On the other hand, the internal profile $P_2$ of height $H_2$ has been achieved solely through the blowing operation. It should be noted that in this case the mold release angle $\alpha$ can be equal to a few degrees, and in particular less than 5°. The localization of the constriction at the seam, thus at the level of excess wall thickness, guarantees a lesser risk of embrittlement.

In addition, it should be noted that the process according to invention, with partial or complete mechanical molding of the internal profile of the neck, ensures excellent control of the bottle wall thickness at the level of this neck with a very high degree of reproducibility which is not as easily attained in the case of a conventional "blown-blown" process, where molding of the bottle's internal profile can only be achieved by less controllable pneumatic forces.

In conclusion, the invention, without disturbing a production line that uses a "blown-blown" technique, and in particular without lowering its production speed, permits forming of bottles whose internal neck profile can be modified easily and in a precise manner by introducing structural and functional modifications of the neck mold.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hollow glass object having a neck with exactly two internal profiles and formed by the steps of:
   mechanically shaping the internal profile of the neck by puncturing the neck using a movable die and a movable punch to produce a first mechanically shaped internal profile terminating in a cylindrical constriction with a substantially vertical sidewall;
   initially blow molding the object in a mold by using a compressed gas to produce a second pneumatically shaped, curved internal profile reaching the constriction, while maintaining the mechanically shaped form of the first internal profile of the neck;
   transferring the initially blow molded object to a finishing mold; and
   performing a finishing blow molding operation in the finishing mold.

2. The object of claim 1 wherein said neck has a localized cylindrical constriction.

3. The object of claim 2 wherein a ratio of the inside diameter of the neck at the constriction to the inside diameter of the neck at a lip thereof is about 0.5.

4. The object of claim 2 including external threading at said neck, wherein said restriction is at a seam at a terminal end of the threading.

5. The object of claim 2 filled with one of a cosmetic and a medical product.

6. The object of claim 1 wherein said puncturing step comprises puncturing the neck to a depth greater than an axial height of the neck.

7. The object of claim 6 wherein said initially blow molding step comprises using the die to maintain the internal profile of the neck.

8. The object of claim 1 wherein said mechanically shaping step comprises:

shaping the internal profile of the neck with the die;

piercing the neck with the punch; and retracting the punch from the neck while maintaining the die in the neck, to permit the compressed gas to enter the pierced hole in the neck while protecting the internal profile from the gas.

9. The object of claim 8 wherein said initially blow molding step comprises blowing gas through the retracted punch followed by retracting the die from the neck.

10. The object of claim 1 wherein said finishing blow molding operation comprises blowing gas into the object while maintaining the mechanically shaped form of the internal profile of the neck.

11. A hollow glass object having a neck with a localized cylindrical constriction at a junction of two internal profiles for control of flow of a liquid therein, wherein a ratio of the inside diameter of the neck at the constriction to the inside diameter of the neck at a lip thereof is about 0.5, and wherein said restriction is at a seam at a terminal end of the threading.

12. The object of claim 11 including a brush type applicator securable to said external threading.

* * * * *